United States Patent
Liu et al.

(10) Patent No.: US 8,619,700 B2
(45) Date of Patent: Dec. 31, 2013

(54) METHOD AND DEVICE FOR REQUESTING AND ALLOCATING BANDWIDTHS IN WIRELESS COMMUNICATION SYSTEMS

(75) Inventors: Jimin Liu, Shanghai (CN); Wu Zheng, Shanghai (CN); Xiaobing Leng, Shanghai (CN)

(73) Assignee: Alcatel Lucent, Paris (FR)

( * ) Notice: Subject to any disclaimer, the term of this patent is extended or adjusted under 35 U.S.C. 154(b) by 269 days.

(21) Appl. No.: 12/988,590

(22) PCT Filed: Apr. 30, 2008

(86) PCT No.: PCT/CN2008/000884
§ 371 (c)(1),
(2), (4) Date: Oct. 19, 2010

(87) PCT Pub. No.: WO2009/132477
PCT Pub. Date: Nov. 5, 2009

(65) Prior Publication Data
US 2011/0038345 A1 Feb. 17, 2011

(51) Int. Cl.
*H04Q 7/00* (2006.01)
*H04J 3/16* (2006.01)

(52) U.S. Cl.
USPC .......................................... 370/330; 370/468

(58) Field of Classification Search
USPC ......... 370/328, 329, 330, 338, 343, 345, 468, 370/336, 344
See application file for complete search history.

(56) References Cited

U.S. PATENT DOCUMENTS

| | | | |
|---|---|---|---|
| 7,916,683 B2 * | 3/2011 | Kwon et al. ................. | 370/322 |
| 2007/0104177 A1 | 5/2007 | Hwang et al. | |
| 2007/0153746 A1 | 7/2007 | Lee et al. | |
| 2007/0189239 A1 | 8/2007 | Lim et al. | |
| 2008/0192723 A1 * | 8/2008 | Kwon ........................... | 370/345 |
| 2008/0233966 A1 * | 9/2008 | Scheim et al. ............. | 455/452.1 |
| 2009/0203384 A1 * | 8/2009 | Vujcic ........................... | 455/450 |
| 2009/0274105 A1 * | 11/2009 | Choi et al. ................... | 370/329 |
| 2010/0027485 A1 * | 2/2010 | Noh et al. ..................... | 370/329 |
| 2011/0032892 A1 * | 2/2011 | Bahl et al. .................... | 370/329 |
| 2012/0099559 A1 * | 4/2012 | Yoshizawa et al. .......... | 370/330 |

FOREIGN PATENT DOCUMENTS

CN 101039280 A 9/2007
WO WO 2007/087842 A1 8/2007

OTHER PUBLICATIONS

International Search Report for PCT/CN2008/000884.

* cited by examiner

*Primary Examiner* — Andrew Lee
(74) *Attorney, Agent, or Firm* — Fay Sharpe LLP (57) ABSTRACT

To address the drawbacks of the current bandwidth requesting and allocation in the wireless broadband access network, the present invention proposes a technical solution of fast bandwidth requesting and allocation, wherein the MS sends a bandwidth allocation request message to the BS for only once, and the interactions between the BS and the MS are decreased so as to increase the efficiency of bandwidth requesting and allocation, effectively shorten the transmission waiting time of traffic data, and especially improve the support for latency-sensitive data traffic. Due to the fact that the interactions between the BS and the MS are decreased, various processing resources in the BS and the MS are spared. Additionally, the BS can also adjust the size of the time/frequency resource block on which each mobile station sends the bandwidth allocation request message according to the number of the mobile stations covered by the base station, and/or according to the traffic types in each mobile station, so as to make the whole wireless communication system operate efficiently.

15 Claims, 6 Drawing Sheets

Fig. 1

PRIOR ART

| Traffic type information | Size of the requested bandwidth | Checking bits |

METHOD AND DEVICE FOR REQUESTING AND ALLOCATING BANDWIDTHS IN WIRELESS COMMUNICATION SYSTEMS

TECHNICAL FIELDS

The invention relates to base stations and mobile stations in wireless communication networks, particularly relates to methods and devices, in mobile stations, for requesting base stations to allocate bandwidths for the mobile stations, and relates to methods and devices, in base stations, for allocating bandwidths for the mobile stations.

BACKGROUND OF THE INVENTION

In recent years, unprecedented prosperity has appeared in the R&D and innovations of the technology of broadband wireless access. The IEEE 802 serial standards are developed rapidly, and technologies such as IEEE 802.11 and 802.16 become the focus in the wireless communication industry. In the broadband wireless access networks, as to the downlink, the base station transmits broadcast control data and data traffic in the way of point-to-multipoint. As to uplink, multiple mobile stations share the transmission medium through TDMA/OFDMA/FDMA/CDMA techniques to transmit data traffic or control information, e.g. bandwidth allocation request messages to the base station.

Figure 1:
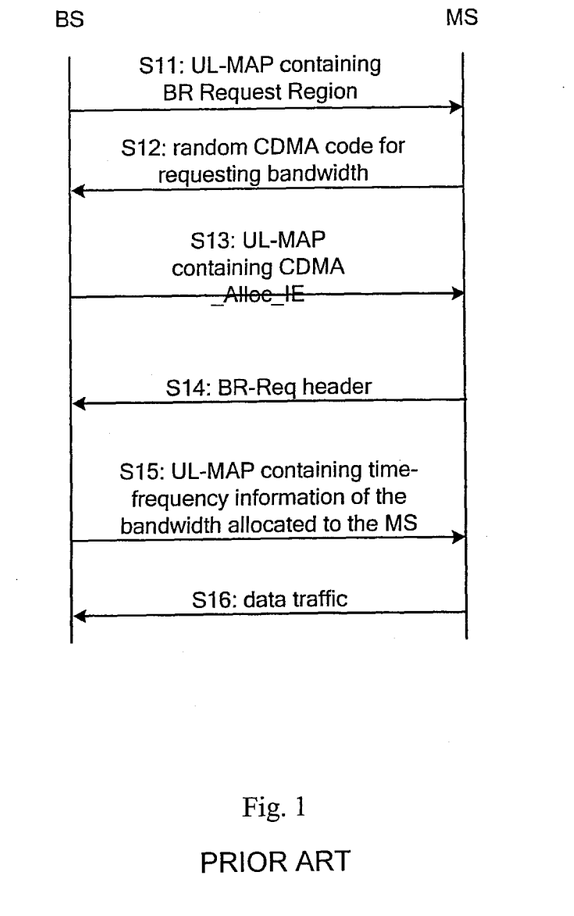
FIG. 1 is a of bandwidth requesting and allocating in the prior art.

One commonly used way of resource allocation is contention-based bandwidth request. As shown in FIG. 1, firstly, in step S11, the BS broadcasts to MSs the UL-MAP in which the BS assigns resource block of bandwidth request region (BR Request Region) for receiving random BR-Req CDMA signals sent by the MSs for requesting bandwidth, so as to carry out bandwidth requesting. Then, in step S12, the MS sends a random BR-Req CDMA signal for requesting bandwidth to BS in the BR Request Region and starts a timer. Next, in step S13, the BS detects data received in the BR Request Region, determines the CDMA code used by MS in the data, and allocates dedicated time/frequency resource for each correctly-detected CDMA code. The information of the dedicated time/frequency resource is placed in the CDMA_Alloc_IE information in the UL-MAP and sent to each MS. The CDMA_Alloc_IE information contains the CDMA code identification detected by the BS, the size and location, of the allocated dedicated resource and the used modulating and encoding schemes. After that, in step S14, each MS keeps monitoring the UL-MAP sent by the BS, and if one MS obtains the CDMA_Alloc_IE information before the timer overflows, it sends a bandwidth allocation request message, namely a BR-Req header, in the corresponding time/frequency resource indicated by the CDMA_Alloc_IE information. The bandwidth allocation request message contains the size of the bandwidth requested by the MS and the connection ID (CID) of the traffic flow that requests this bandwidth. If one MS doesn't receive the CDMA_Alloc_IE information containing the CDMA code that the MS previously sent, the MS increases the transmitting power of the CDMA bandwidth request and starts a new procedure of bandwidth request from step S11.

The drawback of the procedure of the contention-based bandwidth request lies in that: the interactions between the BS and the MS are much frequent. If the MS doesn't receive a CDMA_Alloc_IE information, sent by the MS, in step S14, the MS selects a new CDMA code to re-transmit after a certain period of time. For real-time interactive traffic, this kind of latency maybe is hard to bear. Therefore, it is necessary to improve the way of bandwidth request and allocation.

SUMMARY OF THE INVENTION

To address the drawbacks of the current bandwidth requesting and allocation in the wireless broadband access network, the present invention improves the current bandwidth requesting and allocation method, and proposes a technical solution of fast bandwidth requesting and allocation, wherein the MS sends a bandwidth allocation request message for only once, and the interactions between the BS and the MS are decreased so as to increase the efficiency of bandwidth requesting and allocation.

According to the first aspect of the present invention, it is provided a method, in a mobile station in wireless telecommunication network, for requesting a base station to allocate bandwidths for the mobile station, comprising steps of: a. receiving a first resource allocation notification message from the base station, said first resource allocation notification message comprises the time/frequency resource information of a time/frequency resource block on which each mobile station sends a bandwidth allocation request message randomly, said time/frequency resource block is shared by a plurality of mobile stations; b. sending said bandwidth allocation request message to said base station on the time/frequency resource block indicated by said time/frequency resource information, wherein said bandwidth allocation request message comprises bandwidth allocation request related information.

According to the second aspect of the present invention, it is provided a method, in a base station in wireless telecommunication network, for allocating bandwidths for a mobile station, comprising steps of: A. sending a first resource allocation notification message to said mobile station, said first resource allocation notification message comprises the time/frequency resource information of a time/frequency resource block on which each mobile station sends a bandwidth allocation request message randomly, said time/frequency resource block is shared by a plurality of mobile stations; B. receiving said bandwidth allocation request message from said mobile station on said time/frequency resource block on which each mobile station sends bandwidth allocation request message randomly, said bandwidth allocation request message comprises bandwidth allocation request related information; C. allocating time/frequency resources for said mobile station according to said bandwidth allocation request related information, and generating a second resource allocation notification message; D. sending said second resource allocation notification message to said mobile station.

Preferably, the BS adjusts the size of the time/frequency resource block, on which each mobile station sends the bandwidth allocation request message, according to the number of the mobile stations covered by the base station, and/or according to the traffic types and/or the number of the traffics in each mobile station.

According to the third aspect of the invention, it is provided a requesting apparatus, in a mobile station in wireless telecommunication network, for requesting a base station to allocate bandwidths for the mobile station, characterized in that the apparatus comprises a first receiving means and a first sending means. Wherein the first receiving means is configured for receiving a first resource allocation notification message from the base station, said first resource allocation notification message comprises the time/frequency resource information of a time/frequency resource block on which each mobile station sends a bandwidth allocation request message randomly; and the first sending means is configured for sending said bandwidth allocation request message to said base station on the time/frequency resource block indicated by said time/frequency resource information, wherein said bandwidth allocation request message comprises bandwidth allocation request related information.

According to the fourth aspect of the invention, it is provided an allocating apparatus, in a base station in wireless telecommunication network, for allocating bandwidths for a mobile station, characterized in that, the apparatus comprises a second sending means, a second receiving means and a allocating and generating means. Wherein the second sending means is configured for sending a first resource allocation notification message to said mobile station, said first resource allocation notification message comprises the time/frequency resource information of a time/frequency resource block on which each mobile station sends a bandwidth allocation request message randomly, and said time/frequency resource block is shared by a plurality of mobile stations; the second receiving means is configured for receiving said bandwidth allocation request message from said mobile station on sail time/frequency resource block on which each mobile station sends said bandwidth allocation request message randomly, said bandwidth allocation request message comprises bandwidth allocation request related information; and the allocating and generating means is configured for allocating time/frequency resources for said mobile station according to said bandwidth allocation request related information, and generating a second resource allocation notification message; the second sending means is further configured for sending said second resource allocation notification message to said mobile station.

Preferably, the allocating apparatus further comprises an adjusting means, configured for adjusting the size of said time/frequency resource block on which each mobile station sends said bandwidth allocation request message, according to the number of the mobile stations covered by the base station and/or the traffic types and/or according to the number of the traffics in each mobile station.

Due to the fact that the technical solution of fast bandwidth requesting and allocation of the present invention decreases the interactions between the BS and the MS in the procedure of bandwidth requesting and allocation, the signaling overhead is decreased, the efficiency of bandwidth requesting and allocation is increased, the transmission waiting time of traffic data is shortened effectively, and especially the support for latency-sensitive data traffic is improved. In the present invention, due to the fact that the interactions between the BS and the MS are decreased, various processing resources in the BS and the MS, such as CPU processing resources, are spared. Additionally, in the technical solution of fast bandwidth requesting and allocation of the present invention, the BS can also adjust the size of the time/frequency resource block on which each mobile station sends the bandwidth allocation request message according to the number of the mobile stations covered by the base station, and/or according to the traffic types and/or the number of the traffics in each mobile station, so as to make the whole wireless communication system (comprising one BS and one or more MS covered by the BS) operate efficiently.

Besides, the technical solution of fast bandwidth requesting and allocation of the present invention is compatible with the current contention-based bandwidth requesting and allocation scheme, and the fast bandwidth requesting and allocation scheme of the present invention and the current contention-based bandwidth requesting and allocation scheme can be employed simultaneously in the same wireless communication system.

BRIEF DESCRIPTION OF THE DRAWINGS

Other features, aspects and advantages of the present invention will become obvious by reading the following description of several non-limiting embodiments with the aid of appended drawings.

DETAILED DESCRIPTION OF THE EMBODIMENTS

Figure 2:
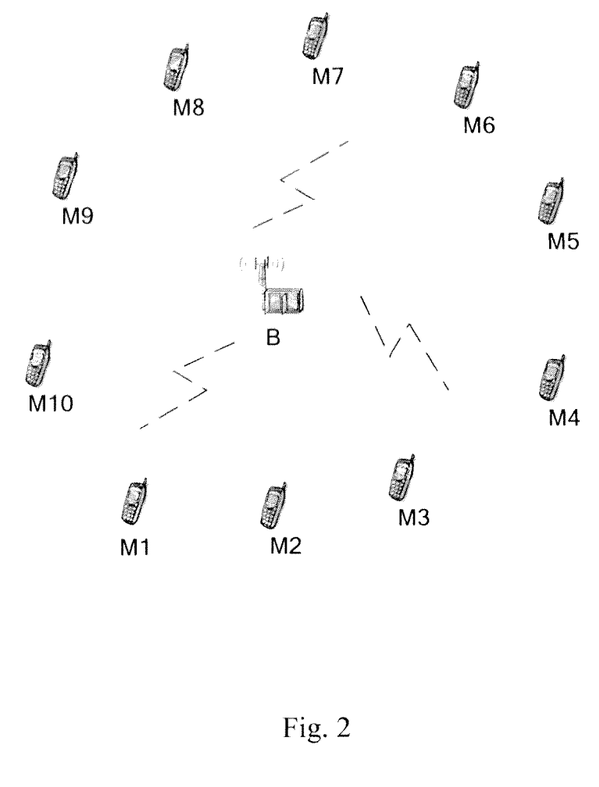
FIG. 2 is a schematic view of the network topology of one part of a wireless communication network.
Figure 3:
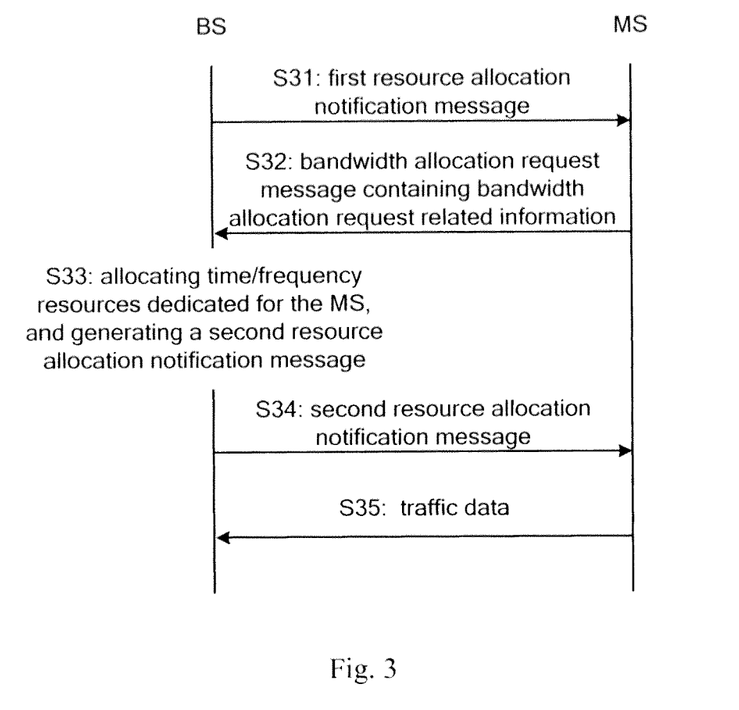
FIG. 3 is a systematic flowchart of fast bandwidth requesting and allocation between one BS and one MS, according to one embodiment of the present invention.

FIG. 2 shows a schematic view of the network topology of one part of a wireless communication network, wherein, multiple MSs M1, M2, M3, . . . , M10 are covered by a BS B. FIG. 3 shows a systematic flowchart of fast bandwidth requesting and allocation between one BS and one MS, according to one embodiment of the present invention. The procedure of fast bandwidth requesting and allocation between the BS B and the MS M1 in FIG. 2 will be elucidated in the following part in conjunction with FIG. 3.

First, in step S31, the BS B sends a first resource allocation notification message to the MS M1. The first resource allocation notification message comprises the time/frequency resource information of a time/frequency resource block on which each mobile station sends a bandwidth allocation request message randomly, and the time/frequency resource block is shared by a plurality of MSs. Taking a WiMAX wireless communication network for example, the first resource allocation notification message is the time/frequency resource information part of the time/frequency resource block on which each mobile station sends a bandwidth allocation request message randomly in the UL-MAP message.

After receiving the first resource allocation notification message, in step S32, the MS M1 sends a bandwidth allocation request message to the BS B on the time/frequency resource block indicated by the time/frequency resource information, according to the time/frequency resource information of the time/frequency resource block on which each mobile station send a bandwidth allocation request message randomly. Wherein, the bandwidth allocation request message comprises bandwidth allocation request related information.

Figure 4:
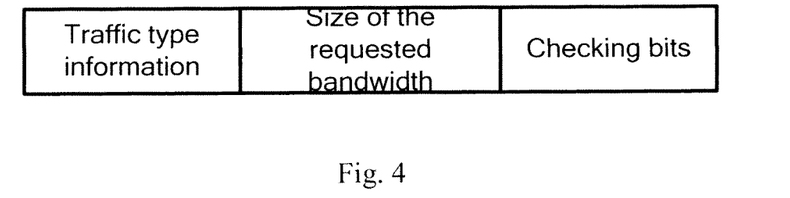
FIG. 4 is a schematic view of the format of the bandwidth allocation request related information of one traffic in the MS, according to one embodiment of the present invention.

FIG. 4 shows a schematic view of the format of bandwidth allocation request related information at one traffic in the MS, according one embodiment at the present invention.

The bandwidth allocation request related information of one traffic contains the traffic type information and the size of bandwidth requested by the traffic. Preferably, it further contains checking bits, such as Cyclic Redundancy Check (CRC) bits. In case that there is more than one traffic that need requests bandwidth, the bandwidth allocation request related information of each traffic can be shown in FIG. 4. The bandwidth request message sent by the MS M1 contains bandwidth allocation request related information of each traffic that needs request bandwidth.

Specifically, taking a WiMAX wireless communication network as example, the traffic type information therein can be represented by the transport connection ID assigned to each traffic of the MS by the BS. For the BS B, the assigned transport connection ID for one MS is unique, and the BS B stores information of the transport connection ID assigned to each traffic of MSs, and the transport connection ID contains traffic type and other parameters such as QoS. The length of the transport connection ID is usually 16 bits. To decrease the length of signaling, the MS M1 and the BS B can agree on how many bits are used to represent the transport connection ID. For example, the BS B allocates 4 transport connection IDs for the MS M1, namely 0x89AB, 0x9ABC, 0xABCD and 0xBCDE. When the MS M1 sends the bandwidth request message, it can use 1, 2, 3 and 4 to respectively replace the above specific transport connection IDs according to the big and small represented by the specific transport connection IDs. In this case, the length of the bandwidth request message can be decreased effectively.

Preferably, the bandwidth allocation request message sent by the MS M1 further contains the identification of the MS M1. For example, in a WiMAX wireless communication network, the identification of the MS M1 is the basic CID of the MS M1. In case that the BS B allocates for the MS M1 a m sequence used for scrambling (the BS B allocates different m sequences for different MSs), the identification of the MS M1 can also be the m sequence.

Back to FIG. 3, following step S32, after receiving the bandwidth allocation request message from the MS M1 on the time/frequency resource block on which the MS M1 sends the bandwidth allocation request message randomly, in step S33, the BS B allocates time/frequency resources for the MS M1 according to the bandwidth allocation request related information of the MS M1, and generates a second resource allocation notification message, and the allocated time/frequency resources are exclusively used by the MS M1. After that, in step S34, the BS B sends the second resource allocation notification message to the MS M1. For a wireless communication network such as WiMAX, the second resource allocation notification message is a part of the UL-MAP message.

After receiving the second resource allocation notification message from the BS B, in step S35, the MS M1 sends data to the BS B on the time/frequency resource block corresponding to the time/frequency resource information, according to the time/frequency resource information about, the resource allocated to the MS M1 contained in the second resource allocation notification message. This time/frequency resource block corresponding to the time/frequency resource information is exclusively used by the MS M1.

Due to the unstable wireless communication channel, when the MS M1 sends the bandwidth allocation quest message to the BS B in step S32, the BS B maybe doesn't receive the bandwidth allocation request message as a result of the loss of the bandwidth allocation request message or collision of the request with other MS. In this case, the MS M1 could neither receive the second resource allocation notification message from BS B1. Thus, after sending the bandwidth allocation request message, if the MS M1 doesn't receive the second resource allocation notification message from BS B1 in a predefined duration, it returns to step S11, that is the B and the MS M1 repeat the steps S31, S32 and so on shown in FIG. 3.

The time/frequency resource block on which each MS sends a bandwidth allocation request message randomly is shared by multiple MSs. In many cases, it is due to the collision between the MSs that the BS B doesn't receive the bandwidth allocation request message from the MS M1. Therefore, in case that the MS M1 doesn't receive the second resource allocation notification message from BS B1 in a predefined duration, it can re-send the request message after a predefined time interval. This time interval can be selected randomly, or be set as a constant value by the BS P for each MS. Generally, the constant value for each of the mobile stations is different from each other. Preferably, the predefined time interval, can be determined by using the truncated binary exponential back off (for the details on the truncated binary exponential back off, please refer to the IEEE 802.16 standard).

Figure 5:
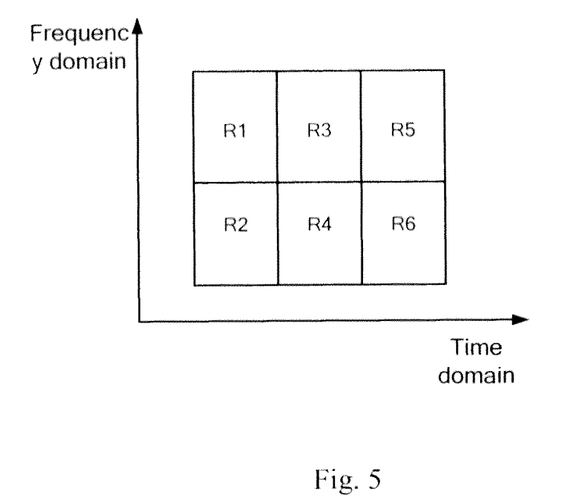
FIG. 5 is a schematic view of one time/frequency resource block, used for the MSs for sending the bandwidth allocation request message, divided into five time/frequency resource sub-blocks by the BS B, according to one embodiment of the invention.

The BS B could further divide the time/frequency resource block on which each MS sends the bandwidth allocation request message into a plurality of time/frequency resource sub-blocks. For example, as shown in FIG. 5, the BS B divides the time/frequency resource block on which each MS sends the bandwidth allocation request message into five time/frequency resource sub-blocks R1, R2, R3, R4 and R5. The BS B could assign (for example when the MS enters this procedure or before the MS M1 uses the method of the present invention) the time/frequency resource sub-blocks R1 is shared by MS M1, M2 and M3, and sends to the MS M1 a sub-block indication message for indicating the position of the time/frequency resource sub-block on which the MS M1 sends the bandwidth allocation request message.

After receiving the first resource allocation notification message, the MS M1 obtains the time/frequency resource information of a time/frequency resource block on which each MS sends a bandwidth allocation request message randomly. And the MS M1 sends the bandwidth allocation request message on the corresponding time/frequency resource sub-block according to the previously obtained sub-block indication message.

Preferably, the BS B further adjusts the size of the time/frequency resource block on which each mobile station sends the bandwidth allocation request message, according to the number of the mobile stations covered by the base station, and/or according to the traffic types and/or the number of the traffics in each mobile station.

For example, all of the MSs covered by the BS B use the fast bandwidth requesting method as shown in FIG. 3 to request the BS the allocate bandwidth. It is assumed that there are ten MSs covered by the BS B initially, and the time/frequency resource block on which each mobile station sends the bandwidth allocation request message just allows the ten MSs to send the bandwidth allocation request messages. At one moment, a new MS enters the coverage of the BS B, therefore the BS B needs to increase the time/frequency resource on which the MSs send the bandwidth allocation request messages, so that the new MS is able to send the bandwidth allocation request message. After some MSs leave the coverage of the BS B, the BS B could decrease the time/frequency resource on which the MSs send the bandwidth allocation request messages in time so as to spare wireless resources. Besides, in case that the number of traffics in each MS increases or decreases, the BS should adjust the size of the time/frequency resource block on which each mobile station sends the bandwidth allocation request message in time.

Further, in case that only time-sensitive traffics in MSs use the fast bandwidth requesting and allocation method as shown in FIG. 3, the BS B adjusts the size of the time/frequency resource block on which each mobile station sends the bandwidth allocation request message, according to the traffic types and/or the number of the traffics in each mobile station. As the number of time-sensitive traffics increases, the BS B increases the time/frequency resource on which the MSs send the bandwidth allocation request messages; and as the number of time-sensitive traffics decreases, the BS B decreases the time/frequency resource on which the MSs send the bandwidth allocation request messages.

Preferably, the BS B could further adjust the size of the time/frequency resource block on which each mobile station sends the bandwidth allocation request message, according to the number of the mobile stations covered by the base station in conjunction with the traffic types and/or the number of the traffics in each mobile station.

In case that the BS B divides the time/frequency resource block on which each mobile station sends the bandwidth allocation request message into a plurality of time/frequency resource sub-blocks, the adjusting for the time/frequency resource block is specified by increasing or decreasing the number of time/frequency resource sub-blocks. If the location of the time/frequency resource sub-blocks for each MS changes, the BS needs to inform each MS of the location of the dynamically allocated time/frequency resource sub-blocks.

Figure 6:
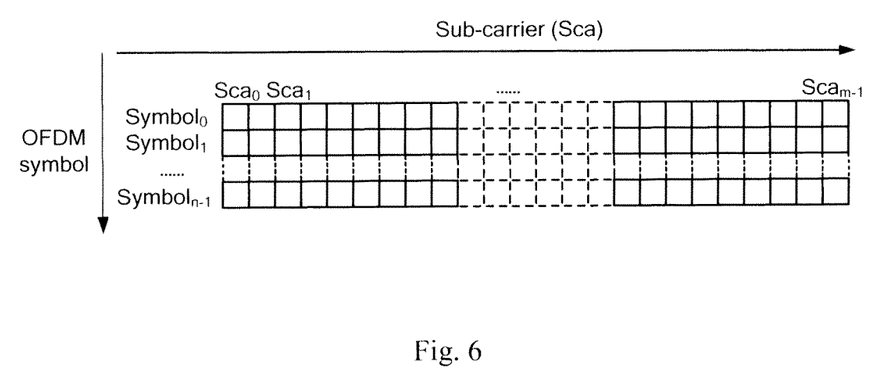
FIG. 6 is a schematic view of one time/frequency resource sub-block in the WiMAX wireless communication network using OFDMA.
Figure 7:
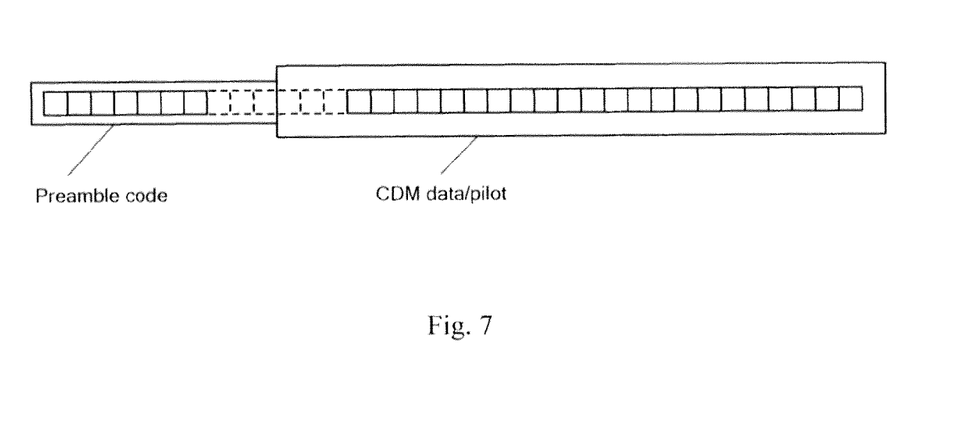
FIG. 7 is one schematic view of the logic variation of the time/frequency resource sub-block in FIG. 6.
Figure 8:
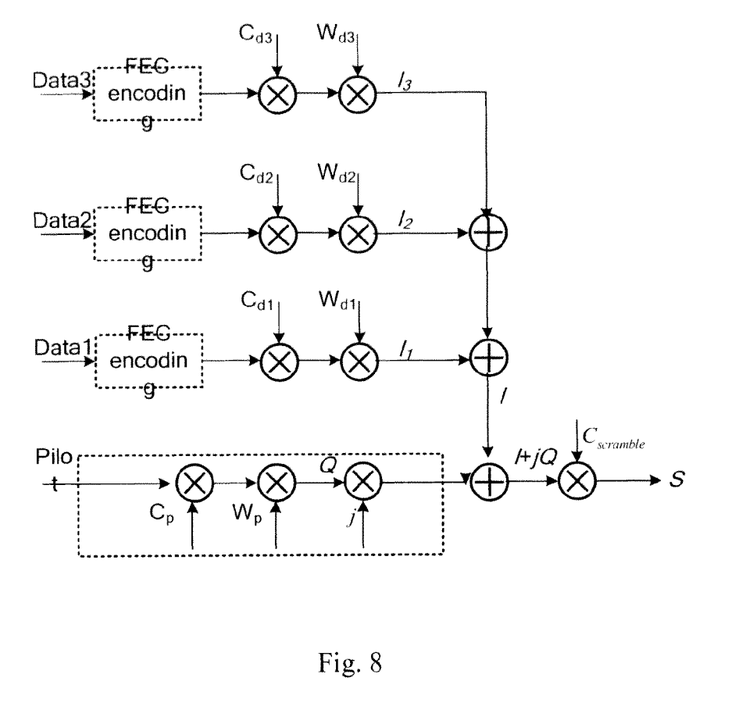
FIG. 8 is a schematic view of the spreading and scrambling to the CDM pilot/data, according to one embodiment of the present invention.

FIG. 6 shows one schematic view of a time/frequency resource sub-block in the WiMAX wireless communication network using OFDMA. The time/frequency resource sub-block is usually called as BR Slot. BR Slot is a matrix of two dimensions in time and frequency, there are m sub-carriers $Sca_0, Sca_2, \ldots, Sca_{m-1}$ in the frequency domain, and there are n OFDM symbols $Symbol_0, Symbol_1, \ldots, Symbol_{n-1}$ in the time domain. Logically, the second OFDM symbol $Symbol_1$ can be put in series behind $Symbol_0$, $Symbol_2$ can be put in series behind $Symbol_0$ and $Symbol_1$, and so on, such that the BR Slot becomes a sub-carrier sequence of one dimension. As shown in FIG. 7, taking CDMA-OFDM modulation used by the MS M as example, the information carried by the sub-carrier sequence of one dimension is preamble code (such as m sequence (for example a gold sequence)) and code-division multiplexed (CDM) pilot/data. The BS could adjust the size of the BR Slot, namely m and n, according to practical requirement such as the length of the bandwidth allocation request message. FIG. 8 shows one schematic view of the spreading and scrambling to the pilot/data of CDMA. By reference to the schematic view of the format of bandwidth allocation request related information shown in FIG. 4, it is assumed that in the MS M1 there are three traffics requesting bandwidth simultaneously, the transport connection IDs of the three traffics are CID1, CID2 and CID3 respectively, and the corresponding data of the bandwidth request related information are Data1, Data2 and Data3 respectively. As shown in FIG. 8, the data of each traffic is processed as one branch, and then all data are combined. Taking Data1 for example, forward error correction (FEC) encoding is carried out to Data1 so as to increase the reliability of the data transmission; after the FEC encoding, Data1 is spread using channelization code $C_{d1}$ and is weighted by gain factors. The Data1 branch is weighted by gain factor $W_{d1}$. The value of the gain factor can be assigned by the BS B, or be self-adaptively adjusted by the MS M1 by considering altogether the spreading factor of the channelization code in each branch and the channel status of the links.

The same processing as that to Data1 is carried out to Data2, Data3 and pilot signals. Of course, the spreading code in each branch is different from each other, and satisfies an orthogonal relation with each other. $C_{d1}, C_{d2}, C_{d3}$ and $C_p$ can be selected as Walsh codes, and can be with different code length, but each branch after spreading is with the same chip rate.

After being weighted by gain factors, the several data branches are combined, and form signals of in-phase branch (I), and the pilot signals form signals of orthogonal branch (Q). The in-phase branch and the orthogonal branch are combined. And scrambling processing is carried out to the combined signals so as to form the CDM pilot/data as shown in FIG. 7. The CDM pilot/data is serialized with pilot sequence and forms signal sequence to be OFDM modulated.

What is to be explained is that, the spreading and scrambling as shown in FIG. 8 are taken as example. There could be only in-phase branch without orthogonal branch, and in this case the pilot signal is taken as a part of the in-phase branch. Otherwise there could be only orthogonal branch without in-phase branch, and in this case the Data1, Data2, Data3 and pilot signal are taken as a part of the orthogonal branch. The FEC encoding in FIG. 8 is optional. In case that the preamble sequence is the m sequence of the MS M1 assigned by the BS B (the BS B assigns different m sequence for each MS for scrambling), the pilot branch in FIG. 8 can be omitted. The BS B recognizes the m sequence so as to know which MS sends this bandwidth allocation request. The BS B could further uses the recognized m sequence to carry out channel estimation, and this of course increases the resource utilization ratio at the cost of a certain channel estimation accuracy. In the same way, to use FEC encoding or not should be considered based on the tradeoff with complexity, reliability and resource utilization ratio.

The ways for the BS B to allocate m sequence for the MS M1 comprise at least the following two ways. One is that the BS B assigns the m sequence for scrambling to MS M1 during the network entry procedure of MS M1. And the other one is to allocate to the MS M1 a m sequence for scrambling the CDM signal after the MS M1 enters the network but before uses the method shown in FIG. 3.

Figure 9:
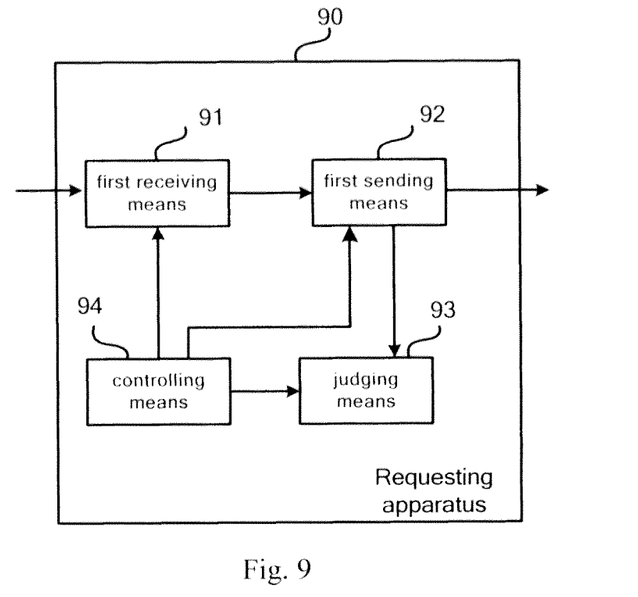
FIG. 9 is a schematic view of the structure of a requesting apparatus, in a mobile station in wireless telecommunication network, for requesting a base station to allocate bandwidths for the mobile station, according to one embodiment of the invention.

FIG. 9 is a schematic view of the structure of a requesting apparatus 90, in a mobile station in wireless telecommunication network, for requesting a base station to allocate bandwidths for the mobile station, according to one embodiment of the invention.

As shown in FIG. 9, the requesting apparatus 90 comprises a first receiving moans 91, a first sending means 92, a judging means 93 and a controlling means 94. Based on the teaching from the present application, those skilled in the art should understand that only the first receiving means 91 and the first sending means 92 are necessary components for implementing the invention, and that the judging means 93 and the controlling means 94 are just optional components. The following part will elucidate the procedure of requesting the base station B for allocating bandwidth carried out by the requesting apparatus 90 in the mobile station M1.

First, the first receiving means 91 receives from the BS B a first resource allocation notification message. The first resource allocation notification message comprises the time/frequency resource information of a time/frequency resource block on which each mobile station sends a bandwidth allocation request message randomly, and the time/frequency resource block is shared by a plurality of MSs. Taking a WiMAX wireless communication network for example, the first resource allocation notification message is the time/frequency resource information part of the time/frequency resource block on which each mobile station sends a bandwidth allocation request message randomly in the UL-MAP message.

After the first receiving means 91 receives the first resource allocation notification message, the first sending means 92 sends a bandwidth allocation request message to the BS B on the time/frequency resource block indicated by the time/frequency resource information, according to the time/frequency resource information of the time/frequency resource block on which each mobile station sends a bandwidth allocation request message randomly. Wherein, the bandwidth allocation request message comprises bandwidth allocation request related information. FIG. 4 shows a schematic view of the format of bandwidth allocation request related information of one traffic in the MS.

The bandwidth allocation request related information of one traffic contains the traffic type information and the size of bandwidth requested by the traffic. Preferably, it further contains checking bits, such as Cyclic Redundancy Check (CRC) bits. In case that there is more than one traffic that need requests bandwidth, the bandwidth allocation request related information of each traffic can be shown in FIG. 4. The bandwidth request message sent by the MS M1 contains bandwidth allocation request related information of each traffic that needs request bandwidth.

Specifically, taking a WiMAX wireless communication network as example, the traffic type information therein can be represented by the transport connection ID assigned to each traffic of the MS by the BS. For the BS P, the assigned transport connection ID for one MS is unique, and the BS B stores information of the transport connection ID assigned to each traffic of MSs, and the transport connection ID contains traffic type and other parameters such as QoS. The length of the transport connection ID is usually 16 bits. To decrease the length of signaling, the MS M1 and the BS B can agree on how many bits are used to represent the transport connection ID. For example, the BS B allocates 4 transport connection IDs for the MS M1, namely 0x89AB, 0x9ABC, 0xABCD and 0xBCDE. When the MS M1 sends the bandwidth request message, it can use 1, 2, 3 and 4 to respectively replace the above specific transport connection IDs according to the big and small represented by the specific transport connection IDs. In this case, the length of the bandwidth request message can be decreased effectively.

Preferably, the bandwidth allocation request message sent by the first sending means 92 further contains the identification of the MS M1. For example, in a WiMAX wireless communication network, the identification of the MS M1 is the basic CID of the MS M1. In case that the BS B allocates for the MS M1 a m sequence used for scrambling (the BS B allocates different m sequences for different MSs), the identification of the MS M1 can also be the m sequence.

After receiving the bandwidth allocation request message from the MS M1 on the time/frequency resource block on which the MS M1 sends the bandwidth allocation request message randomly, in step S33, the BS B allocates time/frequency resources for the MS M1 according to the bandwidth allocation request related information of the MS M1, and generates a second resource allocation notification message, and the allocated time/frequency resources are exclusively used by the MS M1. The BS B sends the second resource allocation notification message to the MS M1. For a wireless communication network such as WiMAX, the second resource allocation notification message is a part of the UL-MAP message.

The first receiving means 91 receives the second resource allocation notification message from the BS B. After that, the first sending means 92 sends data to the BS B on the time/frequency resource block corresponding to the time/frequency resource information, according to the time/frequency resource information about the resource allocated to the MS M1 contained in the second resource allocation notification message. This time/frequency resource block corresponding to the time/frequency resource information is exclusively used by the MS M1.

Due to the unstable wireless communication channel, when the first sending means 92 sends the bandwidth allocation request message to the BS B, the BS B maybe doesn't receive the bandwidth allocation request message as a result of the loss of the bandwidth allocation request message or collision of the request with other MS. In this case, the first sending means 92 could neither receive the second resource allocation notification message from BS B1. Thus, after the first sending means 92 sends the bandwidth allocation request message, if the judging means 93 determines that the first receiving means 91 doesn't receive the second resource allocation notification message from BS B1 in a predefined duration, the controlling means 94 controls the first receiving means 91 and the first sending means 92 repeats the above procedures of receiving and sending.

The time/frequency resource block on which each MS sends a bandwidth allocation request message randomly is shared by multiple MSs. In many cases, it is due to the collision between the MSs that the BS B doesn't receive the bandwidth allocation request message from the MS M1. Therefore, in case that the judging means 93 determines that the first receiving mean 91 doesn't receive the second resource allocation notification message from BS B1 in a predefined duration, the controlling means 94 controls the first sending means 92 to re-send the request message after a predefined time interval. This time interval can be selected randomly, or be set as a constant value by the BS B for each MS. Generally, the constant value for each of the mobile stations is different from each other. Preferably, the predefined time interval can be determined by using the truncated binary exponential back off.

The BS B could further divide the time/frequency resource block on which each MS sends the bandwidth allocation request message into a plurality of time/frequency resource sub-blocks. For example, as shown in FIG. 5, the BS B divides the time/frequency resource block on which each d sends the bandwidth allocation request message into five time/frequency resource sub-blocks R1, R2, R3, R4 and R5. A schematic view of a time/frequency resource sub-block in the WiMAX wireless communication network using OFDMA as shown in FIG. 6.

The BS B could assign (for example when the MS enters this procedure or before the MS M1 uses the method of the present invention) the time/frequency resource sub-blocks R1 is shared by MS M1, M2 and M3, and sends to the MS M1 a sub-block indication message for indicating the position of the time/frequency resource sub-block on which the MS M1 sends the bandwidth allocation request message.

After receiving the first resource allocation notification message, the first receiving means 91 obtains the time/frequency resource information of a time/frequency resource block on which each MS sends a bandwidth allocation request message randomly. And the first sending means 92 sends the bandwidth allocation request message on the corresponding time/frequency resource sub-block according to the previously obtained sub-block indication message.

In the WiMAX wireless communication network using OFDMA, the spreading and scrambling to the bandwidth allocation request message sent by the first sending means 92 are shown in FIG. 8 and described aforesaid.

Figure 10:
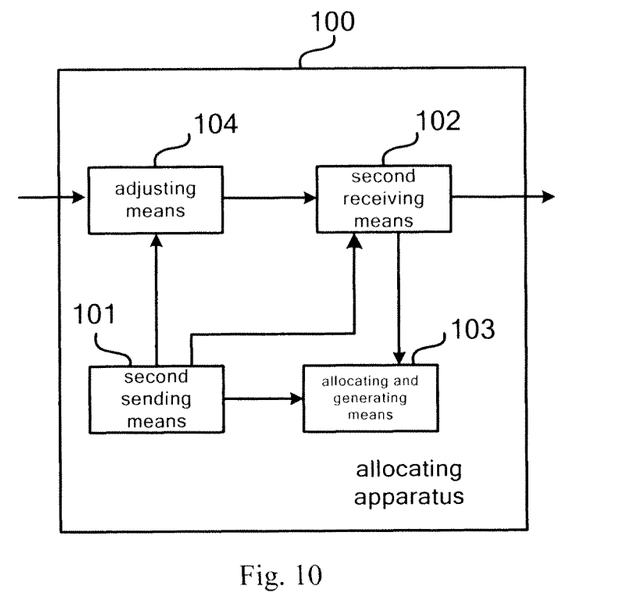
FIG. 10 is a schematic view of the structure of an allocating apparatus, in a base station in wireless telecommunication network, for allocating bandwidths for a mobile station, according to one embodiment of the invention.

FIG. 10 is a schematic view of the structure of an allocating apparatus 100, in a base station in wireless telecommunication network, for allocating bandwidths for a mobile station, according to one embodiment of the invention.

As shown in FIG. 10, the allocating apparatus 100 comprises a second sending means 101, a second receiving means 102, an allocating and generating means 103 and an adjusting means 104. Based on the teaching from the present application, those skilled in the art should understand that only the second sending racers 101, the second receiving means 102 and the allocating and generating means 103 are necessary components for implementing the invention, and that the adjusting means 104 is just an optional component.

The following part will elucidate the procedure of allocating bandwidth for the MS M1 carried out by the allocating apparatus 100 in the BS B.

First, the second sending means 101 sends a first resource allocation notification message to the MS M1. The first resource allocation notification message comprises the time/frequency resource information of a time/frequency resource block on which each mobile station sends a bandwidth allocation request message randomly, and the time/frequency resource block is shared by a plurality of MSs. Taking a WiMAX wireless communication network for example, the first resource allocation notification message is the time/frequency resource information part of the time/frequency resource block on which each mobile station sends a bandwidth allocation request message randomly in the UL-MAP message.

After receiving the first resource allocation notification message, the MS M1 sends a bandwidth allocation request message to the BS B on the time/frequency resource block indicated by the time/frequency resource information, according to the time/frequency resource information of the time/frequency resource block on which each mobile station sends a bandwidth allocation request message randomly. Wherein, the bandwidth allocation request message comprises bandwidth allocation request related information.

FIG. 4 shows a schematic view of the format of bandwidth allocation request related information. The bandwidth allocation request related information of one traffic contains the traffic type information and the sire of bandwidth requested by the traffic. Preferably, it further contains checking bits, such as Cyclic Redundancy Check (CRC) bits. In case that there is more than one traffic that need requests bandwidth, the bandwidth allocation request related information of each traffic can be shown in FIG. 4. The bandwidth request message sent by the MS M1 contains bandwidth allocation request related information of each traffic that needs request bandwidth. Specifically, taking a WiMAX wireless communication network as example, the traffic type information therein can be represented by the transport connection ID assigned to each traffic of the MS by the BS. For the BS B, the assigned transport connection ID for one MS is unique, and the BS B stores information of the transport connection ID assigned to each traffic of MSs, and the transport connection ID contains traffic type and other parameters such as QoS. The length of the transport connection ID is usually 16 bits. To decrease the length of signaling, the MS M1 and the BS B can agree on how many bits are used to represent the transport connection ID. For example, the BS B allocates 4 transport connection IDs for the MS M1, namely 0x89AB, 0x9ABC, 0xABCD and 0xBCDE. When the MS M1 sends the bandwidth request message, it can use 1, 2, 3 and 4 to respectively replace the above specific transport connection IDs according to the big and small represented by the specific transport connection IDs. In this case, the length of the bandwidth request message can be decreased effectively.

Preferably, the bandwidth allocation request message sent by the MS M1 further contains the identification of the MS M1. For example, in a WiMAX wireless communication network, the identification of the MS M1 is the basic CID of the MS M1. In case that the BS B allocates for the MS M1 a m sequence used for scrambling (the BS B allocates different m sequences for different MSs), the identification of the MS M1 can also be the m sequence.

The second receiving means 102 receives the bandwidth allocation request message from the MS M1 on the time/frequency resource block on which the MS M1 sends the bandwidth allocation request message randomly. After that, the allocating and generating means 103 allocates time/frequency resources for the MS M1 according to the bandwidth allocation request related information of the MS M1, and generates a second resource allocation notification message, and the allocated time/frequency resources are exclusively used by the MS M1. After that, the second sending means 101 sends the second resource allocation notification message to the MS M1. For a wireless communication network such as WiMAX, the second resource allocation notification message is a part of the UL-MAP message.

After receiving the second resource allocation notification message from the BS B, the MS M1 sends data to the BS B on the time/frequency resource block corresponding to the time/frequency resource information, according to the time/frequency resource information about the resource allocated to the MS M1 contained in the second resource allocation notification message. This time/frequency resource block corresponding to the time/frequency resource information is exclusively one by the MS M1.

The BS B could further divide the time/frequency resource block on which each MS sends the bandwidth allocation request message into a plurality of time/frequency resource sub-blocks. For example, as shown in FIG. 5, the BS B divides the time/frequency resource block on which each MS sends the bandwidth allocation request message into five time/frequency resource sub-blocks R1, R2, R3, R4 and R5. A schematic view of the time/frequency resource sub-block in the WiMAX wireless communication network using OFDMA shown in FIG. 6.

The BS B could assign (for example when the MS enters this procedure or before the MS M1 uses the method of the present invention) the time/frequency resource sub-block R1 is shared by MS M1, M2 and M3. The second sending means 101 sends to the MS M1 a sub-block indication message for indicating the position of the time/frequency resource sub-block on which the MS M1 sends the bandwidth allocation request message. After receiving the first resource allocation notification message, the MS M1 obtains the time/frequency resource information of a time/frequency resource block on which each MS sends a bandwidth allocation request message randomly. And the MS M1 sends the bandwidth allocation request message on the corresponding time/frequency resource sub-block according to the previously obtained sub-block indication message.

Preferably, the adjusting means 104 further adjusts the size of the time/frequency resource block on which each mobile station sends the bandwidth allocation request message, according to the number of the mobile stations covered by the base station, and/or according to the traffic types and/or the number of the traffics in each mobile station. For example, all of the MSs covered by the BS B use the fast bandwidth requesting method as shown in FIG. 3 to request the BS the allocate bandwidth. It is assumed that there are ten MSs covered by the BS B initially, and the time/frequency resource block on which each mobile station sends the bandwidth allocation request message just allows the ten MSs to send the bandwidth allocation request messages. At one moment, a new MS enters the coverage of the BS B, therefore the BS B needs to increase the time/frequency resource on which the MSs send the bandwidth allocation request messages, so that the new MS is able to send the bandwidth allocation request message. After some MSs leave the coverage of the BS B, the adjusting means 104 could decrease the time/frequency resource on which the MSs send the bandwidth allocation request messages in time so as to spare wireless resources. Besides, in case that the number of traffics in each MS increases or decreases, the BS should adjust the size of the time/frequency resource block on which each mobile station sends the bandwidth allocation request message in time.

Further, in case that only time-sensitive traffics in MSs use the fast bandwidth requesting and allocation method as shown in FIG. 3, the adjusting means 104 adjusts the size of the time/frequency resource block on which each mobile station sends the bandwidth allocation request message, according to the traffic types in each mobile station. As the number of time-sensitive traffics increases, the adjusting means 104 increases the time/frequency resource on which the MSs send the bandwidth allocation request messages; and as the number of time-sensitive traffics decreases, the adjusting means 104 decreases the time/frequency resource on which the MSs send the bandwidth al location request message Preferably, the adjusting means 104 could further adjust the size of the time/frequency resource block on which each mobile station sends the bandwidth allocation request message, according to the number of the mobile stations covered by the base station in conjunction with the traffic types and/or the number of the traffics in each mobile station.

In case that the BS B divides the time/frequency resource block on which each mobile station sends the bandwidth allocation request message into a plurality of time/frequency resource sub-blocks, the adjusting for the time/frequency resource block carried out by the adjusting means 104 is specified by increasing or decreasing the number of time/frequency resource sub-blocks. If the location of the time/frequency resource sub-blocks for each MS changes, the second sending means 101 needs to inform each MS of the location of the dynamically allocated time/frequency resource sub-blocks.

Although the description takes the WiMAX wireless communication network as example for elucidating the invention, based on the teaching of the present application, those skilled in the art should understand that the invention is not limited to this and is applicable for other wireless communication networks. And the technical solutions of the invention could be implemented by way of either software or hardware.

The preferable embodiments of the present invention have been described above. What is to be understood is that the invention is not limited by those above specific embodiments, and easy modifications can be made by those skilled in the art without departing from the scope of the appended claims.

What is claimed is:

1. A method, in a mobile station in a wireless telecommunication network, for requesting a base station to allocate bandwidths for the mobile station, comprising:
   receiving a first resource allocation notification message from the base station, said first resource allocation notification message comprising the time or frequency resource information of a time or frequency resource block on which each mobile station sends a bandwidth allocation request message randomly, said time or frequency resource block being shared by a plurality of mobile stations; and
   sending said bandwidth allocation request message to said base station on the time or frequency resource block indicated by said time or frequency resource information, wherein said bandwidth allocation request message comprises bandwidth allocation request-related information.

2. A method as claimed in claim 1, further comprising, before receiving a first resource allocation notification message from the base station:
   receiving from said base station a sub-block indication message for indicating the position of the time or frequency resource sub-block on which said mobile station sends said bandwidth allocation request message,
      wherein said time or frequency resource block on which each mobile station sends said bandwidth allocation request message comprises a plurality of time or frequency resource sub-blocks,
      wherein the bandwidth allocation request message is sent to said base station on said time or frequency resource sub-block indicated by said sub-block indication message, according to said time or frequency resource information.

3. A method as claimed in claim 1, comprising, after sending said bandwidth allocation request message to said base station:
   receiving a second resource allocation notification message from said base station, said second resource allocation notification message comprising the time or frequency resource information allocated for said mobile station by said base station according to said bandwidth allocation request message, and where the time or frequency resource block indicated by said time or frequency resource information is exclusively used by said mobile station.

4. A method as claimed in claim 1, comprising, after sending said bandwidth allocation request message to said base station:
   judging whether said second resource allocation notification message is received from said base station in a predefined duration;
   if said second resource allocation notification message is not received in said predefined duration, receiving a first resource allocation notification message from the base station and sending said bandwidth allocation request message to said base station on the resource block indicated by said time or frequency resource information.

5. A method as claimed in claim 4, further comprising:
performing the receiving and sending repeatedly after a predefined time interval if said second resource allocation notification message is not received in said predefined duration.

6. A method as claimed in claim 5, wherein said method further comprises:
determining said predefined time interval according to the truncated binary exponential back-off algorithm.

7. A method as claimed in claim 1, wherein said bandwidth allocation request-related information comprises the traffic identification in said mobile station and the bandwidth requested by said mobile station.

8. A method as claimed in claim 7, wherein said wireless telecommunication network comprises WiMAX wireless telecommunication network, and the traffic identification in said mobile station comprises the connection identification of the traffic flow in said mobile station.

9. A method, in a base station in a wireless telecommunication network, for allocating bandwidths for a mobile station, comprising:
sending a first resource allocation notification message to said mobile station, said first resource allocation notification message comprising the time or frequency resource information of a time or frequency resource block on which each mobile station sends a bandwidth allocation request message randomly, said time or frequency resource block being shared by a plurality of mobile stations;
receiving said bandwidth allocation request message from said mobile station on said time or frequency resource block on which each mobile station sends said bandwidth allocation request message randomly, said bandwidth allocation request message comprising bandwidth allocation request-related information;
allocating base station time or frequency resources for said mobile station according to said bandwidth allocation request-related information, and generating a second resource allocation notification message, said allocated time or frequency resources being exclusively used by said mobile station; and
sending said second resource allocation notification message to said mobile station.

10. A method as claimed in claim 9, further comprising, before sending a first resource allocation notification message to said mobile station:
sending to said mobile station a sub-block indication message for indicating the position of the time or frequency resource sub-block on which said mobile station sends said bandwidth allocation request message;
wherein the bandwidth allocation request message from the mobile station is received on time or frequency resource sub-block on which said mobile station sends said bandwidth allocation request message,
wherein said time or frequency resource block on which each mobile station sends said bandwidth allocation request message comprises a plurality of time or frequency resource sub-blocks.

11. A method as claimed in claim 9, wherein said method further comprises:
adjusting the size of said time or frequency resource block on which each mobile station sends said bandwidth allocation request message according to the number of the mobile stations covered by the base station, and/or the traffic types and/or the number of the traffics in each mobile station.

12. A method as claimed in claim 9, wherein said bandwidth allocation request related information comprises the traffic identification in said mobile station and the bandwidth requested by said mobile station.

13. A method as claimed in claim 12, wherein said wireless telecommunication network comprises WiMAX wireless telecommunication network, and the traffic identification in said mobile station comprises the connection identification of the traffic flow in said mobile station.

14. A requesting apparatus, in a mobile station in a wireless telecommunication network, for requesting a base station to allocate bandwidths for the mobile station, comprising:
a first receiver, for receiving a first resource allocation notification message from the base station, said first resource allocation notification message comprising the time or frequency resource information of a time or frequency resource block on which each mobile station sends a bandwidth allocation request message randomly, said time or frequency resource block being shared by a plurality of mobile stations; and
a first transmitter, for sending said bandwidth allocation request message to said base station on the time or frequency resource block indicated by said time or frequency resource information, wherein said bandwidth allocation request message comprises bandwidth allocation request related information.

15. An allocating apparatus, in a base station in a wireless telecommunication network, for allocating bandwidths for a mobile station, comprising:
a second transmitter, configured to send a first resource allocation notification message to said mobile station, said first resource allocation notification message comprising the time or frequency resource information of a time or frequency resource block on which each mobile station sends a bandwidth allocation request message randomly, and said time or frequency resource block being shared by a plurality of mobile stations;
a second receiver, configured to receive said bandwidth allocation request message from said mobile station on said time or frequency resource block on which each mobile station sends said bandwidth allocation request message randomly, said bandwidth allocation request message comprising bandwidth allocation request-related information; and
an allocating and generating device configured to allocate time or frequency resources for said mobile station according to said bandwidth allocation request related information, and generate a second resource allocation notification message, said allocated time or frequency resources being exclusively used by said mobile station;
wherein said second sending transmitter is further configured to send said second resource allocation notification message to said mobile station.

* * * * *